Jan. 4, 1966 R. H. COOK 3,227,925
CONTROL FOR SWITCH MEANS
Filed June 27, 1962 3 Sheets-Sheet 1

INVENTOR.
Ralph H. Cook,
BY
Robert R. Lockwood
Atty.

United States Patent Office 3,227,925
Patented Jan. 4, 1966

3,227,925
CONTROL FOR SWITCH MEANS
Ralph H. Cook, Royal Oak, Mich., assignor to S & C Electric Company, Chicago, Ill., a corporation of Delaware
Filed June 27, 1962, Ser. No. 205,602
22 Claims. (Cl. 317—58)

This invention relates, generally, to high voltage disconnecting circuit interrupters and it has particular relation to the control of a device of this character such as disclosed in application Serial No. 111,998, filed May 23, 1961, by John J. Mikos and Leonard V. Chabala and in application Serial No. 172,017, filed February 8, 1962, by Sigurd I. Lindell and Leonard V. Chabala, now Patent No. 3,163,736, issued December 29, 1964.

Switch means of the type above referred to are intended for operation on electric power transmission lines operating at relatively high voltages, such as 34.5 kv., 69 kv., and above. The parts of the switch means energized at line voltage above ground are supported by porcelain insulators of a size and strength corresponding to the voltage of the system and mechanical stress incident to the mounting of these live parts for their operation. In many applications of devices of this nature it is desirable that provision be made for automatically opening the circuit by operating the switch means in response to the flow of predetermined current in the circuit in which it is connected. Also it may be desirable to open the circuit when its voltage to ground falls below a predetermined voltage. It has been customary to employ current and potential transformers suitably connected to the high voltage circuit to sense the current and voltage of the circuit and to provide for operating relays at ground potential to effect opening of the circuit by operating the switch means to open circuit position. The higher the voltage of the circuit the greater is the insulation that is required for the current and potential transformers. Such devices, especially for the higher voltages, are costly. It is to provide current and voltage sensing means for incorporation in circuit interrupting devices, such as those disclosed in the above identified applications, or as separate current and voltage sensing means that this invention is particularly addressed.

Accordingly, among the objects of this invention are: To employ in a new and improved manner the porcelain insulators required to support the live circuit interrupter and switch parts from the ground as the insulation for current and voltage sensing means by making one or more of them hollow; to position a secondary winding of a current transformer on a line terminal conductor of the switch means with its winding energized at the line voltage and to connect it to energize the operating winding of an overcurrent relay located within the insulator supporting this line terminal and arranged to control the movement of an armature mechanically connected by an insulating rod extending through the insulator to control mechanism at the other end thereof for initiating the sequence of operations incident to opening the switch means; to control the energization of the operating winding of the overcurrent relay in such manner that its speed of response is inversely proportional to the magnitude of the current flow through the circuit interrupting means; to prevent the energization of the operating winding of the overcurrent relay when the current flow through the circuit interrupting means exceeds a predetermined magnitude; to sense the voltage at which the circuit is energized through the provision of impedance means in a hollow insulator supporting the same; and to utilize current flow derived from the impedance means at its grounded portion to hold open contacts as long as predetermined voltage is applied to the circuit in which the switch means is connected and which contacts are arranged to close and initiate the sequence of operations incident to opening the switch means when the voltage of the circuit falls below such predetermined voltage.

Figure 1:
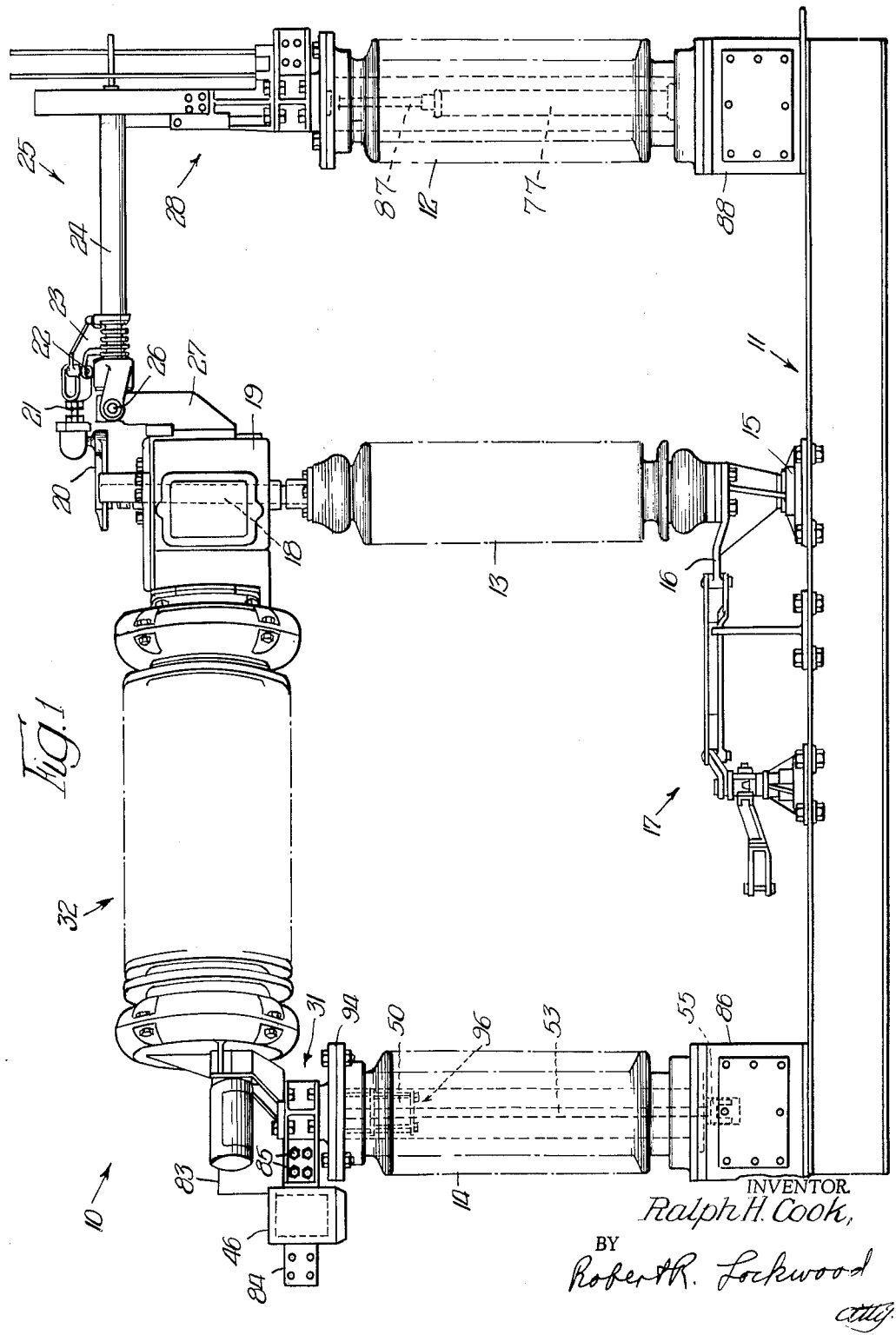
FIG. 1 is a view, in side elevation, of one pole of a three phase installation showing a switch construction of the disconnecting circuit interrupter type with which the present invention is embodied.

Referring now particularly to FIG. 1 of the drawings, it will be observed that the reference character 10 designates, generally, switch means in which the present invention is embodied. The switch means 10 includes a base, indicated generally at 11, that may be formed of a pair of rolled steel channels suitably secured together. Mounted on the base 11 are a first insulator 12, which is hollow, a second insulator 13, which is rotatable, and a third insulator 14, which is hollow. The second insulator 13 is rotatably mounted on a bearing 15 that is carried by the base 11 which, it will be understood, is grounded. The lower end of the rotatable insulator 13 has an arm 16 extending therefrom for connection to a suitable operating linkage that is indicated, generally, at 17. It will be understood that for three phase operation three of the switch means 10 are mounted on a suitable switching structure, in proper spaced relation, depending upon the voltage of the circuit and that suitable operating means, common to the operating linkage 17, is provided for effecting simultaneous rotation of the second insulator 13 of each switch means 10 for effecting simultaneous operation of the three switch means 10 for either opening or closing the circuit as may be required.

Extending upwardly from and rotatable with the second insulator 13 is a shaft 18. The shaft 18 extends through and is rotatably mounted on a mechanism housing 19 the details of construction of which are set forth in U.S. Patent No. 3,030,481, issued April 17, 1962, to W. A. Gussow and John J. Mikos. For present purposes it is pointed out that the shaft 18 extends through the mechanism housing 19 and carries at its upper end a switch crank 20 which is rotatable therewith. The switch crank 20 is pivotally connected to a link 21 that is pivoted at 22 to an arm 23 which extends from a switch blade 24 that forms a part of a disconnecting switch that is indicated, generally, at 25. The switch blade 24 is pivoted at 26 on a bracket 27 which is carried by one wall of the mechanism housing 19. At its swinging end the switch blade 24 is arranged to move into and out of high pressure contact engagement with a line contact member, shown generally at 28, which is carried by the first insulator 12. It will be understood that, on rotation of the second insulator 13 by the operating linkage 17, the corresponding rotation of the switch crank 20 is effected for swinging the switch blade 24 out of or into high pressure contact engagement with the line contact member 28, depending upon the direction of rotation.

It is desirable that the switch blade 24 be opened only after the circuit has been opened previously by some other means. The reason for this is to prevent the drawing of an arc between the swinging end of the switch blade 24 and the line contact member 28 when the circuit is interrupted under load which might result in damage to these parts or the creation of a fault by arcing over to an adjacent phase or to ground. For this purpose there is mounted between the mechanism housing 19 and a line terminal 31, which is carried by the third insulator 14, a current interrupter that is indicated, generally, at 32. As described in application Serial No. 111,998, above referred to, separable contact means are provided in the current interrupter 32 which are operated by the mechanism within the mechanism housing 19 under the control of the shaft 18. The arrangement is such that the contacts of the circuit interrupter 32 are opened and any arc incident thereto is drawn and extinguished therein before the switch blade 24 moves out of contact engagement with the line contact member 28. The continued rotation of the rotatable insulator 13 in the opening direction serves to recock the operating spring in the mechanism housing 19 that is tripped for opening the contacts of the current interrupter 32. In addition these contacts are reclosed while the switch blade 24 is being rotated to its full open position. On reverse rotation of the rotatable insulator 13, only the switch blade 24 is rotated and the circuit is completed when it makes contact engagement with the line contact member 28.

Figure 3:
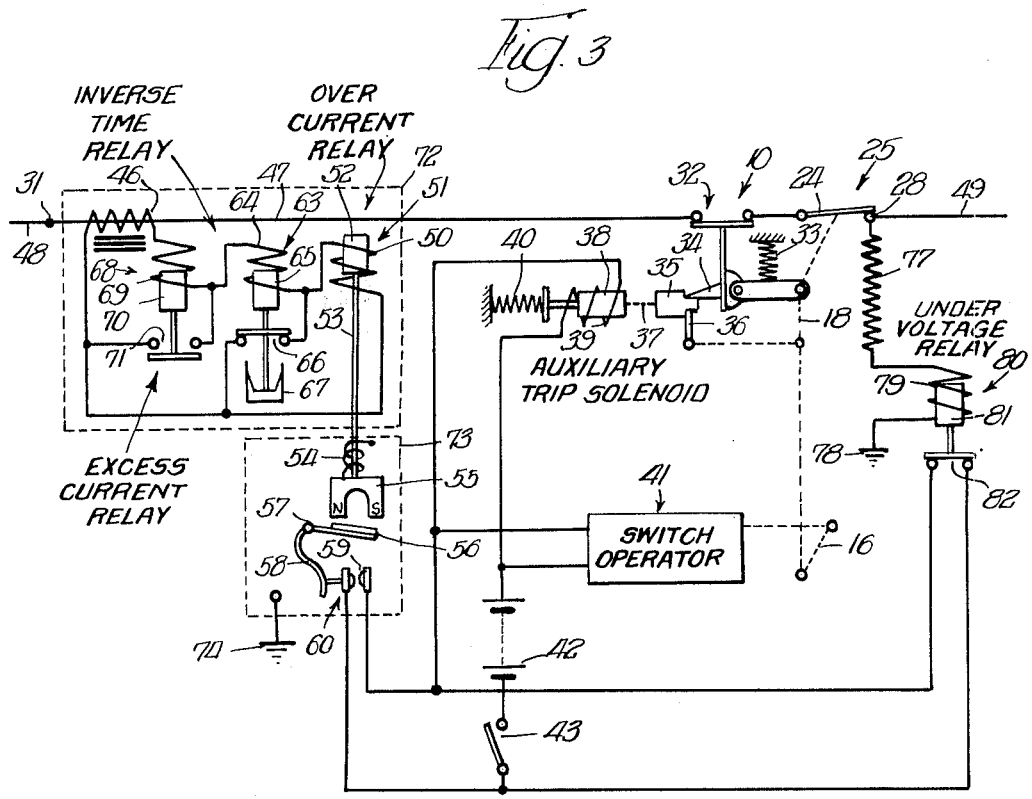
FIG. 3 shows, diagrammatically, the circuit connections that can be employed in practicing the present invention, it being understood that the circuit connections for two other phases of a three phase system are essentially the same insofar as the elements individual thereto are concerned.

Referring now particularly to FIG. 3 of the drawings, it will be observed that the various parts of the switch means 10 are shown diagrammatically. The spring, above referred to, for opening the contacts of the circuit interrupter 32 is indicated at 33 and provision is made for restraining it by a shoulder 34 which engages a main latch 35. Two means are provided for disengaging the main latch 35 from a shoulder 34 to permit the spring 33 to open the contacts of the circuit interrupter 32. One of these means comprises a mechanism cam 36 that is arranged to be rotated by the shaft 18. Another means for tripping the main latch 35 involves an auxiliary trip mechanism as described in application Serial No. 172,017, above referred to. This arrangement includes a suitable mechanical linkage 37 interconnecting the main latch 35 and an armature 38 which is arranged to be attracted by an operating winding 39 to move the armature 38 against the biasing force of a spring 40. The shaft 18 can be rotated by a suitable switch operator 41 which is electrically operated from a source of electrical energy, such as a battery 42, on closure of a control switch 43 and the closure of certain control contacts to be described. It will be understood that on energization of the operating winding 39 and of the switch operator 41, the main latch 35 is withdrawn from the shoulder 34 either as the result of energization of the operating winding 39 or rotation of the shaft 18 to the end that the contacts of the current interrupter 32 are opened. That action is followed by continued rotation of the shaft 18 and subsequent opening of the switch blade 24. The subsequent opening and closing functions are as described hereinbefore.

As pointed out it is desirable to initiate the opening sequence of operations for the switch means 10 on flow of predetermined current in the circuit in which the switch means 10 is connected. In order to sense the magnitude of current flow in the circuit, a secondary winding 46 is provided in conjunction with a conductor 47 to provide a current transformer arrangement. It will be understood that the secondary winding 46 is energized substantially at the same voltage as the conductor 47 with which it is inductively related, the insulation therebetween being only sufficient to permit the current transformer operation since no part of the associated electrical circuit is grounded or operates at any other voltage. As shown the conductor 47, which is illustrated in FIG. 3 as interconnecting the contacts of the current interrupter 32 and the line terminal 31, is a part of the switch structure. A load circuit, represented by a conductor 48, is connected to the line terminal 31. A power supply circuit, represented by a conductor 49, is connected to the line contact member 28. This arrangement is typical of the circuit connections for the switch means 10. However, it will be understood that other arrangements can be made as desired.

Figure 4:
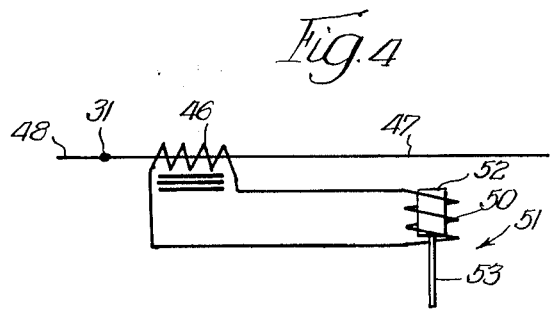
FIG. 4 shows diagrammatically, a modification of the system shown in FIG. 3.

The secondary winding 46, as shown in FIG. 4, can be connected directly across an operating winding 50 of an overcurrent relay that is indicated, generally, at 51. The overcurrent relay 51 includes an armature 52 to which an insulating rod 53 is connected and is moved thereby. As will appear hereinafter the overcurrent relay 51 is mounted within the hollow insulator 14 and the insulating rod 53 extends therethrough to the oposite end where a compression spring 54 serves to bias it and the armature 52 to the non-operated position. While provision is made for moving the insulating rod 53 endwise, by suitable modification it can be rotated about its longitudinal axis as a result of energization of the operating winding 50 to perform the control function hereinafter outlined.

At the end of the insulating rod 53 opposite the armature 52 there is mounted a permanent magnet 55 which has a generally C-shape and it is arranged to control the movement of an armature 56 which is pivoted at 57 and which is provided with an arm 58 that controls the closure of contacts 59 of a snap switch 60. Where the interior of the hollow insulator 14 is not required to be sealed from the atmosphere, the insulating rod 53 can extend entirely therethrough to operate directly the contacts 59 of the snap switch 60.

It will be apparent that, when current flows through the switch means 10 from the power supply circuit 49 to the load circuit 48, a corresponding current will be induced in the secondary winding 46 and will flow through the operating winding 50 of the overcurrent relay 51. Upon flow of a predetermined current the current flow through the operating winding 50 is sufficient to attract the armature 52 and overcome the force of the spring 54. The permanent magnet 55 is then moved downwardly into a position where it can attract the armature 56. The armature 56 swings about its pivot 57 and closes the contacts 59 of the snap switch 60. An obvious circuit then is completed for energizing the operating winding 39 and the switch operator 41 from the battery 42, assuming that the switch 43 is closed. The result is that the sequence of operations is initiated for opening the switch means 10 and interrupting the flow of current in the circuit.

When it is desired to control the operation of the overcurrent relay 51 as an inverse function of the current flow through the switch means 10, an inverse time relay, shown generally at 63, can be employed. In FIG. 3 it will be observed that this relay has an operating winding 64 which is connected in series circuit relation with the operating winding 50 of the overcurrent relay 51. Also it has an armature 65 and normally closed contacts 66 which shunt the operating winding 50. A dash pot 67 is employed to provide the inverse time characteristic of the operation of the armature 65. It will be understood that other types of inverse time mechanisms can be employed such as a relay of the rotating disc type. Depending upon the magnitude of the current flow through the switch means 10 the armature 65 is moved at a speed which is inversely proportional thereto so that the higher the current flow the quicker the normally closed contacts 66 are opened to permit energization of the operating winding 50 of the overcurrent relay 51 and subsequent closure of the contacts 59 for initiating the opening sequence for the switch means 10.

In many instances the switch means 10 has limited current interrupting ability. It is desirable that provision be made for preventing its operation in the event that the current flow therethrough exceeds a predetermined current for the reason that such an excess current flow would be beyond the interrupting capabilities of the switch means 10. In order to take care of this situation, an excess current relay, indicated generally at 68, is employed. It includes an operating winding 69 which is connected in series circuit relation with the operating windings 50 and 64 to the end that all three operating windings are connected in series circuit relation across the secondary winding 46. The excess current relay 68 also includes an armature for controlling normally open contacts 71. When the current flow through the switch means 10 is in excess of a predetermined value, the arrangement is such that the contacts 71 of the excess current relay 68 are closed prior to the opening of the contacts 66 of the inverse time relay 63. It will be observed that the contacts 71, when closed, shunt the series connected operating windings 50 and 64 with the result that they cannot be energized as long as the contacts 71 remain closed.

It will be recalled that the secondary winding 46 is mounted on the conductor 47 and thus it is at substantially the voltage of this conductor. One of its terminals can be connected directly to the conductor 47 and parts electrically connected thereto. In addition, the operating windings 50, 64 and 69 are all arranged to be energized at the voltage of the conductor 47 and for this purpose they are shown as being enclosed in the broken line outline 72. The insulating rod 53, which has such insulating characteristics and is of such a length as to compare with the insulation characteristics of the hollow insulator 14 through which it extends, serves to interconnect mechanically the armature 52 with the permanent magnet 55 for effecting the operation of the contacts 59 which are shown as being enclosed by the broken line outline 73 and grounded at 74. When this arrangement is employed, it is unnecessary to provide expensive insulation for the secondary winding 46 of the current transformer whose primary winding is the conductor 47. Instead, advantage is taken of the insulation provided by the hollow insulator 14 to mount the secondary winding 46 and relay windings 50, 64 and 69 energized therefrom on the insulator 14 at the end where the energized conductor 47 and the line terminal 31 are supported and then to provide the necessary mechanical connection to the insulating rod 53 having appropriate insulating characteristics and extending through the hollow insulator 14 to operate control mechanism at the opposite end and at ground potential. For adjusting the relays 51, 63 and 68 to vary their operating characteristics an additional insulated rod, similar to the rod 53, can be mounted within the hollow insulator 14 to permit the adjustments to be made without requiring that the associated circuit be deenergized.

The construction of the insulator 12 is similar to that of the insulator 14. Mounted within the opening of the insulator 12 is an impedance device 77 in the form of a resistor having an ohmic value such that only a small amount of current is permitted to flow therethrough from the line contact member 28 to which it is connected at one end to ground 78 at the other end. At the grounded end of the impedance device 77 the arrangement is such that the current flow takes place through an operating winding 79 of an under voltage relay that is indicated, generally, at 80. The operating winding 79 has sufficient current flowing therethrough when the voltage of the power supply circuit 49 is at or above a predetermined voltage to attract an armature 81 and hold contacts 82 normally open. They are shown closed in FIG. 3 on the assumption that the system is in the deenergized condition. Now, when the voltage of the power supply circuit 49 with respect to ground 78 falls below a predetermined value, there is a corresponding reduction in the flow of current through the operating winding 79. As a result the normally open contacts 82 are closed and they complete a circuit for effecting the energization of the operating winding 39 and of the switch operator 41 for the purpose of initiating the opening sequence of operations for the switch means 10 in the manner previously described.

Referring now particularly to FIG. 1, it will be noted that a metallic relay housing 83 is mounted on the line terminal 31. This is provided for receiving the inverse time relay 63 and the excess current relay 68. An extension 84 projects from the line terminal 31 and is secured thereto by bolts 85 for the purpose of mounting thereon the secondary winding 46, previously referred to, and its magnetic core. At its lower end of the hollow insulator 14 is mounted on an enclosure 86 which is provided for receiving the lower end of the insulating rod 53, the permanent magnet 55 and the operating mechanism for the snap switch 60.

Also, as shown in FIG. 1, the hollow insulator 12 has the impedance device 77 extending centrally therethrough with the upper end being connected by a conductor 87 to the underside of the line contact member 28. The hollow insulator 12 is mounted on an enclosure 88 carried by the base 11 in which the under voltage relay 80 is located.

Figure 2:
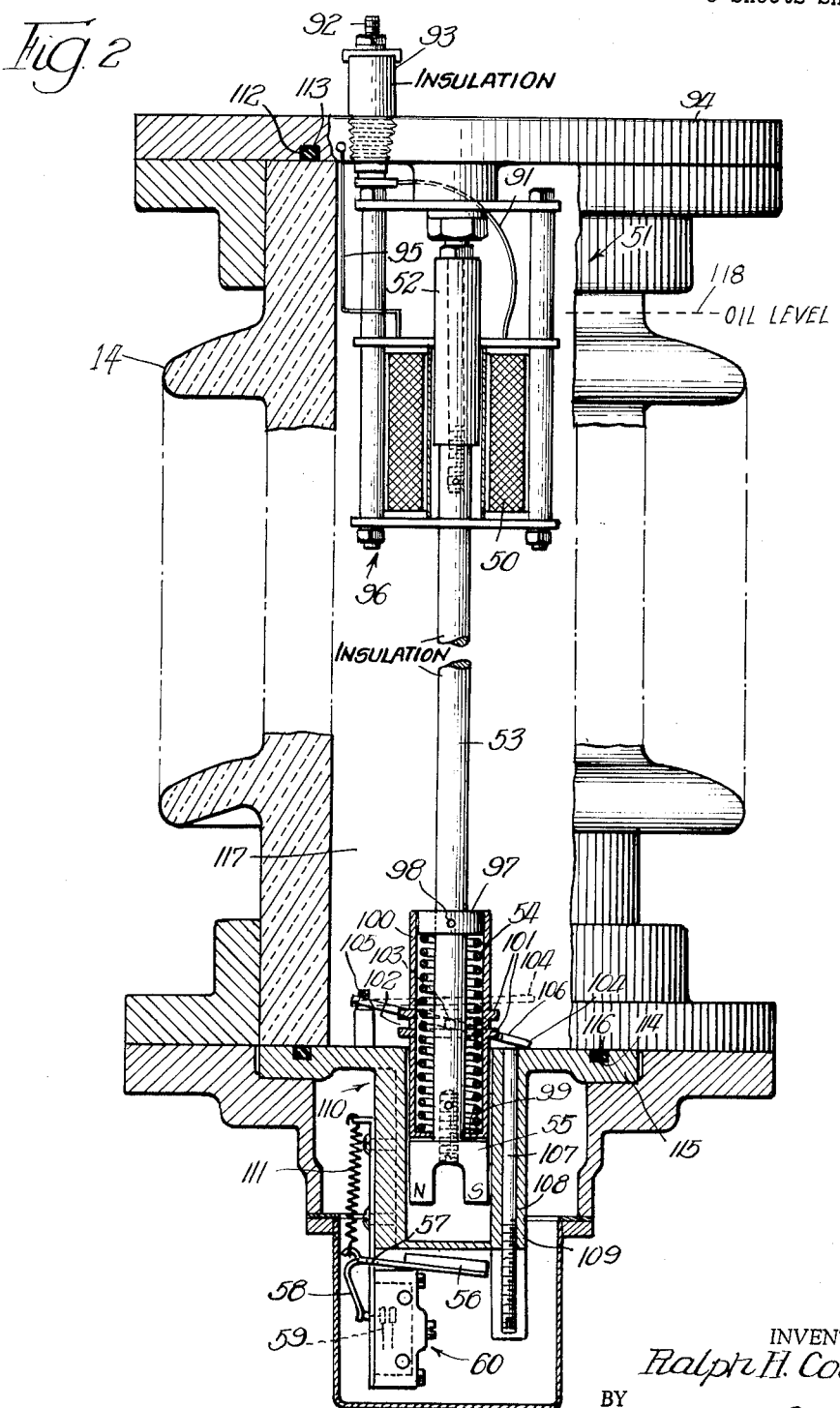
FIG. 2 is a view partly in vertical section and partly in elevation at an enlarged scale showing the internal details of construction of the hollow insulator and parts associated therewith in which the overcurrent relay is mounted.

FIG. 2 of the drawings shows the internal details of construction of the hollow insulator 14 and parts associated therewith. Here it will be observed that a conductor 91 connects one side of the operating winding 50 to a rod 92 that extends through an insulator bushing 93 which is threaded at its lower end through a terminal plate 94 on which the line terminal 31 is mounted. It will be understood that the upper end of the rod 92 is connected directly to one terminal of the secondary winding 46, as in FIG. 4, or to one terminal of the operating winding 64 of the inverse time relay 63, if the same is employed and mounted in the metallic relay housing 83. Another conductor 95 connects the other side of the operating winding 50 to the terminal plate 94. A suitable support structure 96, carried by the terminal plate 94 on its under side, serves to hold the operating winding 50 in position at the upper end of the hollow insulator 14.

The insulating rod 53 extends substantially the full length of the hollow insulator 14 and at its lower end is provided with a ring 97 which is secured thereto by a transverse pin 98. The ring 97 serves as an abutment for the upper end of the compression spring 54, the lower end of which bears against a shoulder 99 which is inturned from the lower end of a spring cage 100. Intermediate the ends of the spring cage 100 are radially extending rings 101—101 which provide a groove 102 therebetween for interfitting with trunnions, one of which is shown at 103, that extend inwardly from a yoke 104 that is pivotally mounted at 105. For this purpose the other end 106 of the yoke 104 is arranged to be moved upwardly by an adjusting screw 107 that is threaded into a wall 108 of a hollow extension 109 which guides the spring cage 100 and also serves as a guide for the permanent magnet 55. The hollow extension 109 is formed integrally with a fitting 110 that is formed of non-magnetic material such as brass. A coil tension spring 111 serves to bias the armature 56 to the non-operated position.

The hollow insulator 14 preferably is sealed at its ends. For this purpose an annular groove 112 is provided in the under side of the terminal plate 94 and an "O" ring of suitable gasket material is provided therein. In a similar manner an annular groove 114 is provided in the upper side of a flange 115 that forms a part of the fitting 110 and an "O" ring 116 of suitable gasket material is provided.

Preferably, the interior 117 of the hollow insulator 14 is filled with a suitable insulating gas, such as $SF_6$ or a suitable insulating liquid, to the level indicated at 118. It will be understood that the hollow insulator 12 is similarly constructed and that it has its ends sealed in the same manner that the ends of the hollow insulator 14 are sealed. Also, it is filled with an insulating gas or insulating liquid.

The insulating rod 53 provides a mechanical connection through the hollow insulator 14 from the line terminal 31, energized at high voltage, to the mechanism within the enclosure 86 at ground potential. It is formed of a relatively light weight plastic impregnated fiber glass and, since it extends through an insulating liquid, it is unnecessary to give consideration to the provision of corrugations to provide for long leakage distance or to prevent ionization or tracking as would be the case if the insulating rod 53 extended through a gaseous insulating medium.

What is claimed as new is:

1. In an electric power transmission system comprising an alternating current power supply circuit and a load circuit adapted to be energized at relatively high voltage with respect to ground, circuit interrupter means interconnecting said circuits and trip means therefor, a secondary winding inductively related to and energized at the voltage of one of said circuits for induction therein of current flow whose magnitude corresponds to the current flow in said circuits, an overcurrent relay having an armature and a winding therefor connected for energization to said secondary winding and energized at the voltage of said circuits for moving said armature from one position to another on flow of predetermined current in said circuits, grounded control means operatively connected to said trip means; hollow insulator means carrying said secondary winding, the high voltage circuit associated therewith, and said overcurrent relay; and insulator means extending through said hollow insulator means and operatively interconnecting said armature and said grounded control means for operating said trip means to open said circuit interrupter means on flow of said predetermined current in said circuits and operation of said armature from said one position to the other.

2. The invention, as set forth in claim 1, wherein the hollow insulator means is sealed and contains an insulating liquid.

3. The invention, as set forth in claim 2, wherein the hollow insulator means is sealed and is filled with an insulating gas.

4. The invention, as set forth in claim 1, wherein an excess current relay is carried by the hollow insulator means and has a winding connected in series circuit relation with the secondary winding and normally open contacts in shunt with the winding of the overcurrent relay, said winding of said excess current relay being arranged and adapted to close its normally open contacts on flow of current in the circuits in excess of a predetermined magnitude before operation of said overcurrent relay and to shunt the winding thereof to prevent its energization as long as the excess current continues to flow.

5. The invention, as set forth in claim 1, wherein an inverse time relay is carried by the hollow insulator means and has a winding connected in series circuit relation with the secondary winding and normally closed contacts in shunt with the winding of the overcurrent relay, said winding of said inverse time relay being arranged and adapted to open its normally closed contacts on flow of current in the circuits of predetermined magnitude and for a predetermined time whereupon said overcurrent relay is operated.

6. The invention, as set forth in claim 5, wherein an excess current relay is carried by the hollow insulator means and has a winding connected in series circuit relation with the secondary winding and normally open contacts in shunt with the winding of the overcurrent relay and the winding of the inverse time relay in series circuit relation, said winding of said excess current relay being arranged and adapted to close its normally open contacts on flow of current in the circuits in excess of a predetermined magnitude before operation of said overcurrent and inverse time relays and to shunt their windings to prevent energization thereof as long as the excess current continues to flow.

7. In an electric power transmission system comprising an alternating current power supply circuit and a load circuit adapted to be energized at relatively high voltage with respect to ground, circuit interrupter means interconecting said circuits and trip means therefor, hollow insulator means carrying one of said high voltage circuits, impedance means extending through said hollow insulator means and connected between said one of said circuits and ground, said impedance means being characterized by permitting a flow therethrough of relatively small current, grounded control means operatively connected to said trip means, and an undervoltage relay having a winding connected for energization at the grounded part of said impedance means and normally open contacts connected to said grounded control means and arranged and adapted on predetermined reduction in voltage of said one circuit to ground to close and effect operation of said trip means.

8. The invention, are set forth in claim 1, wherein impedance means is interposed between the other of the circuits and ground and is characterized by permitting a flow therethrough of relatively small current, hollow insulator means carries said other circuit and said impedance means extends therethrough, and an undervoltage relay is provided having a winding connected for energization at the grounded part of said impedance means and normally open contacts connected to the grounded control means and arranged and adapted on predetermined reduction of the voltage of said other circuit to ground to close and effect operation of the trip means as aforesaid.

9. High voltage switch means comprising, in combination, grounded support means; first, second and third insulators mounted on said support means in parallel spaced relation, a line contact member including a first line terminal mounted on said first insulator, a second line terminal mounted on said third insulator, a mechanism housing mounted on said second insulator, a shaft rotatably mounted on and extending within said mechanism housing, a switch blade mounted on said second insulator to move into and out of engagement with said line contact member, connecting means between said shaft and said switch blade whereby rotation of the former effects the aforesaid movement of the latter, separable contact means interconnecting said second line terminal and said switch blade and arranged and adapted to be opened on rotation of said shaft in a direction to move said switch blade out of engagement with said line contact member, operating means in part at least on said support insulatingly connected to said shaft for rotating it to open said contact means and subsequently move said switch blade out of contact engagement with said line contact member, a secondary winding inductively related to and energized at the voltage of one of said line terminals for induction therein of current flow whose magnitude corresponds to the current flow through said switch blade and separable contact means in closed position, the insulator carrying the line terminal terminal individual to said secondary winding being hollow and having an overcurrent relay in its distal end including an armature and a winding therefor connected for energization to said secondary winding and energized at the voltage thereof for moving said armature from one position to another endwise of its insulator on flow of predetermined current in said switch blade and separable contact means in closed position, control means at the opposite end of the last mentioned insulator operatively connected to said operating means for controlling the latter, and insulating rod means extending endwise of said last mentioned insulator and mechanically interconnecting said armature and said control means for causing said operating means to rotate said shaft as aforesaid on flow of predetermined current in said switch blade and separable contact means in closed position.

10. The invention, as set forth in claim 9, wherein the insulator carrying the other line terminal at one end is hollow and impedance means connected to said other line terminal extends therethrough and is characterized by permitting a flow to ground of relatively small current, and an undervoltage relay is provided having a winding connected for energization at the grounded part of said impedance means and normally open contacts connected to the operating means and arranged and adapted on predetermined reduction of the voltage of said other line terminal to ground to close and effect opening of the separable contact means and switch blade.

11. The invention, as set forth in claim 9, wherein an excess current relay is mounted on the distal end of the hollow insulator and has a winding connected in series circuit relation with the secondary winding and normally open contacts in shunt with the winding of the overcurrent relay, said winding of said excess current relay being arranged and adapted to close its normally open contacts on flow of current through the switch blade and separable contact means in excess of a predetermined magnitude before operation of said overcurrent relay and to shunt the winding thereof to prevent its energization as long as the excess current continues to flow.

12. The invention, as set forth in claim 9, wherein an inverse time relay is mounted on the distal end of the hollow insulator and has a winding connected in series circuit relation with the secondary winding and normally closed contacts in shunt with the winding of the overcurrent relay, said winding of said inverse time relay being arranged and adapted to open its normally closed contacts on flow of current through the switch blade and separable contact means of predetermined magnitude and for a predetermined time whereupon said overcurrent relay is operated.

13. The invention, as set forth in claim 12, wherein an excess current relay is mounted on the distal end of the hollow insulator and has a winding connected in series circuit relation with the secondary winding and normally open contacts in shunt with the winding of the overcurent relay and the winding of the inverse time relay in series circuit relation, said winding of said excess current relay being arranged and adapted to close its normally open contacts on flow of current through the switch blade and separable contact means in excess of a predetermined magnitude before operation of said overcurrent and inverse time relays and to shunt their windings to prevent energization thereof as long as the excess current continues to flow.

14. In combination, circuit means adapted to be energized at a relatively high voltage above ground, a hollow insulator containing an insulating fluid supporting said circuit means at one end and grounded at the other end, electro-responsive operating means at said one end of said insulator energized at the voltage of said circuit means and including a member movable in response thereto, operated means at said other end of said insulator including a movable member, and an insulating member extending through said insulating fluid and interconnecting said movable members whereby the movement of the first mentioned member is transmitted to the second mentioned movable member.

15. The invention, as set forth in claim 14, wherein the insulating member is a relatively light weight rod of insulating material, and the fluid is an insulating liquid.

16. In an electric power transmission system comprising an alternating current power supply circuit and a load circuit adapted to be energized at relatively high voltage with respect to ground, circuit interrupter means interconnecting said circuits and trip means therefor, a hollow insulator containing an insulating fluid and forming at one end a part of a support for said circuit interrupter and grounded at the other end, a secondary winding at said one end of said insulator inductively related to and energized at the voltage of one of said circuits for induction therein of current flow whose magnitude corresponds to the current flow in said circuits, electro-responsive operating means at said one end of said insulator including an overcurrent relay having a movable member in the form of an armature and a winding therefor connected for entergization to said secondary winding for moving said armature from one position to another on flow of predetermined current in said circuits, operated means at said other end of said insulator including a movable member operatively connected to said trip means, and an insulating member extending through said insulating fluid in said hollow insulator and interconnecting said movable members whereby movement of the first mentioned member is transmitted to the second mentioned movable member for operating said trip means to open said circuit interrupter means on flow of said predetermined current in said circuits.

17. In an electric power transmission system, a current carrying conductor adapted to be energized at a relatively high voltage level with respect to ground, current sensing means energized substantially at the potential of said conductor and responsive to current flow therein, hollow insulator means between said conductor and ground, control means adapted to be energized at a relatively low voltage level with respect to ground, and solid insulating means in said hollow insulator means operatively directly interconnecting said current sensing means and said control means to operate the latter in accordance with current flow in said conductor.

18. In an electric power transmission system, a current carrying conductor adapted to be energized at a relatively high voltage leved with respect to ground, hollow insulator means between said conductor and ground, current sensing means carried by said hollow insulator means adjacent said conductor and energized substantially at its potential and responsive to current flow therein, control means adapted to be energized substantially at ground potential, and solid insulating means extending through said hollow insulator means and operatively directly interconnecting said current sensing means at relatively high potential and said control means at relatively low potential to transmit energy from the former to the latter to operate the latter in accordance with current flow in said conductor.

19. In an electric power transmission system, a current carrying conductor adapted to be energized at a relatively high voltage level with respect to ground, current sensing means energized substantially at the potential of said conductor and responsive to current flow therein, hollow insulator means between said conductor and ground, control means adapted to be energized at a relatively low voltage level with respect to ground, solid insulator means in said hollow insulator means operatively directly interconnecting said current sensing means and said control means to operate the latter in accordance with current flow in said conductor, and an insulating medium surrounding said solid insulator means and substantially filling said hollow insulator means.

20. In an electric power transmission system comprising a power supply circuit and a load circuit adapted to be energized at a relatively high voltage level with respect to ground, circuit interrupter means interconnecting said circuits and trip means therefor, hollow insulator means having one end adjacent one of said circuits and adapted to be grounded at the other end, current sensing means carried by said hollow insulator means adjacent said one circuit and energized substantially at its potential and responsive to current flow therein, control means for said trip means adapted to be energized substantially at ground potential, and solid insulating means in said hollow insulator means operatively directly interconnecting said current sensing means and said control means to operate said trip means and open said circuit interrupter means on flow of predetermined current in said circuits.

21. In an electric power transmission system comprising an alternating current power supply circuit and a load circuit adapted to be energized at a relatively high voltage level with respect to ground, circuit interrupter means interconnecting said circuits and trip means therefor, hollow insulator means having one end adjacent one of said circuits and adapted to be grounded at the other end, a secondary winding inductively related to and energized substantially at the potential of one of said circuits to have alternating current induced therein, current sensing means carried by said hollow insulator means at said one end and connected for energization to and at the potential of said secondary winding, control means for said trip means adapted to be energized substantially at ground potential, and solid insulating means in said hollow insulator means operatively directly interconnecting said current sensing means and said control means to operate said trip means and open said circuit interrupter means in response to predetermined current flow in said circuits as determined by said secondary winding and measured by said current sensing means.

22. In an alternating current electric power transmission system, a conductor adapted to be energized at relatively high voltage with respect to ground, hollow insulator means supporting said conductor at one end and adapted to be grounded at the other end, a secondary winding carried by said hollow insulator means at said one end and inductively related to said conductor to have alternating current induced therein, electro-responsive operating means at said one end of said hollow insulator means including a member movable in response thereto, operated means at said other end of said hollow insulator means including a movable member, and an insulating member extending through said hollow insulator means and interconnecting said movable members whereby movement of the first mentioned member is transmitted to the second mentioned movable member.

References Cited by the Examiner
UNITED STATES PATENTS

| | | | |
|---|---|---|---|
| 833,211 | 10/1906 | Hilliard | 317—57 |
| 998,990 | 7/1911 | Ryder | 317—57 |
| 1,154,359 | 9/1915 | Basch | 317—57 X |
| 1,654,646 | 1/1928 | Hartwig | 319—9 X |
| 1,971,146 | 8/1934 | Rovere et al. | 317—16 |
| 2,057,472 | 10/1936 | Bonds | 317—9 |
| 2,804,576 | 8/1957 | Coggeshall et al. | 317—9 |
| 2,855,545 | 10/1958 | Beyrard | 317—31 X |
| 2,954,448 | 9/1960 | Baker | 200—146 |
| 3,030,481 | 4/1962 | Gussow et al. | 200—146 |
| 3,116,391 | 12/1963 | Lindell et al. | 200—146 |

SAMUEL BERNSTEIN, *Primary Examiner.*

UNITED STATES PATENT OFFICE
CERTIFICATE OF CORRECTION

Patent No. 3,227,925　　　　　　　　　　　　　　　January 4, 1966

Ralph H. Cook

It is hereby certified that error appears in the above numbered patent requiring correction and that the said Letters Patent should read as corrected below.

Column 1, line 13, after "Chabala" insert -- , now Patent No. 3,163,736, issued December 29, 1964, --; line 16, for "3,163,736, issued December 29, 1964" read -- 3,116,391, issued December 31, 1963 --; column 3, lines 58 and 59, strike out "opening and closing functions are as described hereinbefore" and insert instead -- switch opening and closing functions are as described hereinbefore --; column 10, line 9, for "entergization" read -- energization --; line 35, for "leved" read -- level --.

Signed and sealed this 6th day of December 1966.

(SEAL)
Attest:

ERNEST W. SWIDER
Attesting Officer

EDWARD J. BRENNER
Commissioner of Patents